July 14, 1931. R. S. JACOBSEN 1,814,165
VARIABLE SPEED TRANSMISSION
Filed Aug. 12, 1929 4 Sheets-Sheet 1

July 14, 1931. R. S. JACOBSEN 1,814,165
VARIABLE SPEED TRANSMISSION
Filed Aug. 12, 1929 4 Sheets-Sheet 2

Inventor
Richard S. Jacobsen
By Arthur F. Durand
Atty.

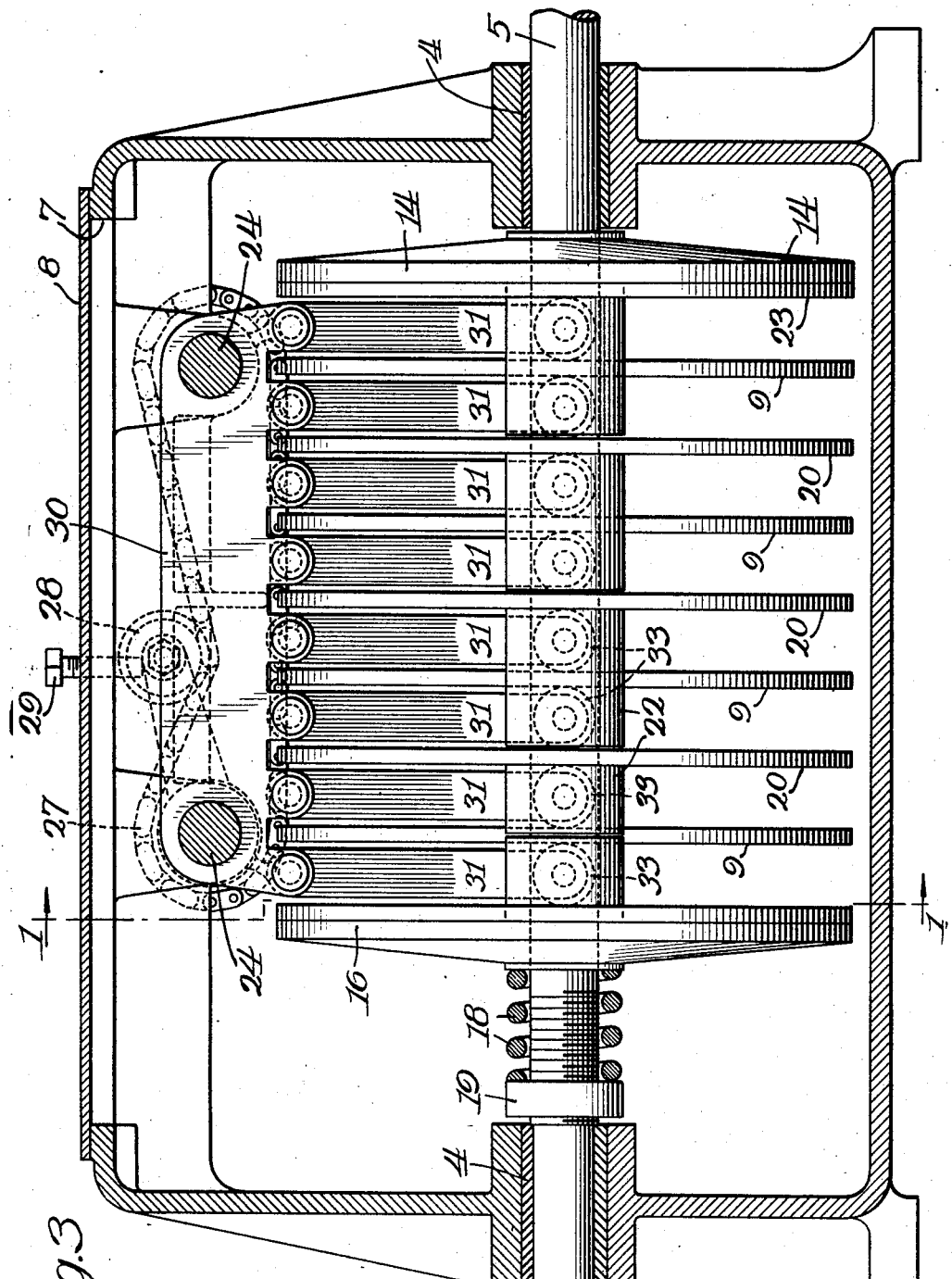

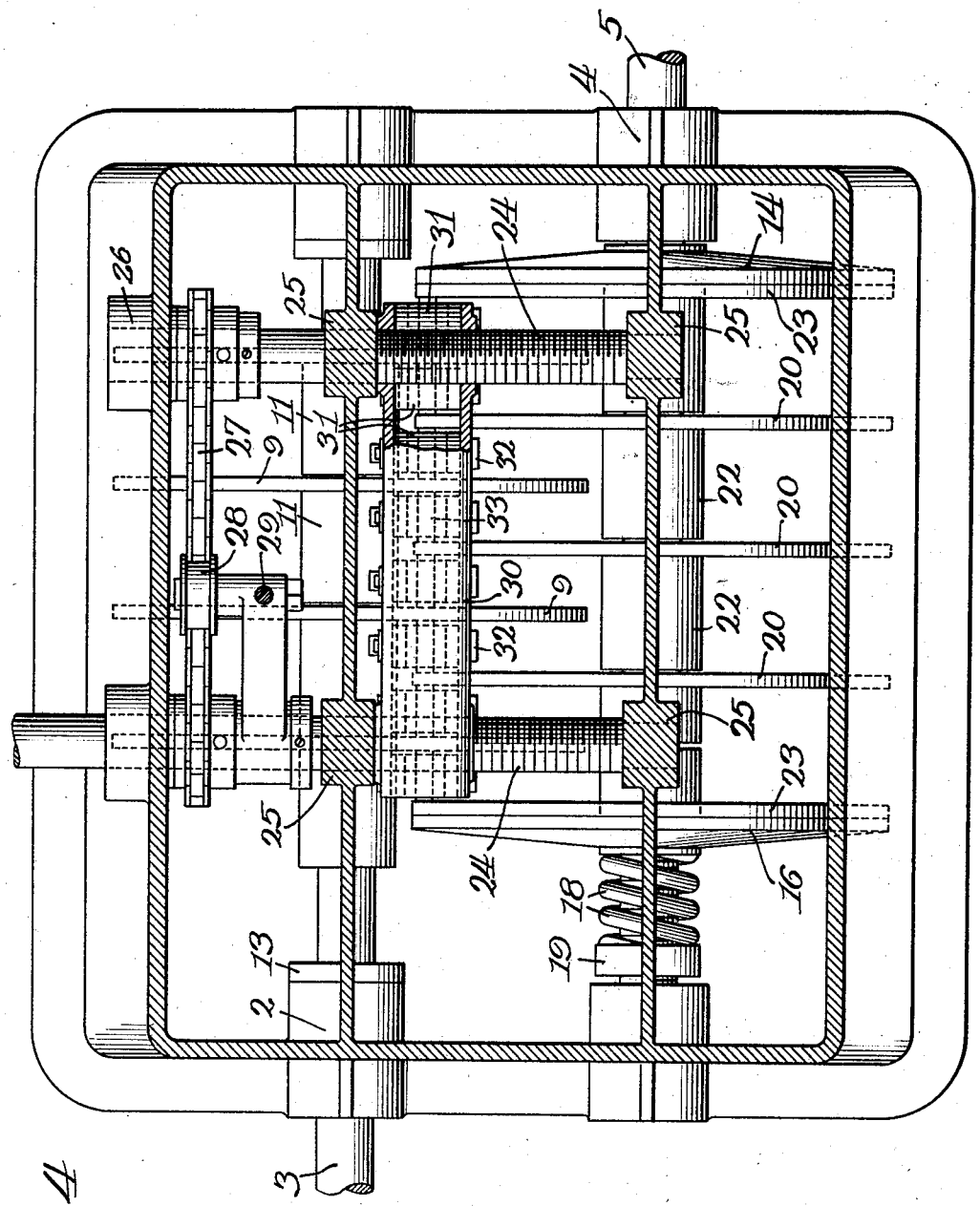

Patented July 14, 1931

1,814,165

UNITED STATES PATENT OFFICE

RICHARD S. JACOBSEN, OF WHEATON, ILLINOIS, ASSIGNOR TO J. F. S. COMPANY, OF CHICAGO, ILLINOIS, A CORPORATION OF ILLINOIS

VARIABLE SPEED TRANSMISSION

Application filed August 12, 1929. Serial No. 385,129.

This invention relates to variable or change speed transmission, and more particularly to transmission mechanism of this kind having frictionally engaging parts, whereby the transmission is a variable friction drive.

Generally stated, the object of the invention is to provide a novel and improved construction whereby parallel friction disks on one shaft are frictionally coupled to similar disks on another shaft, by friction idlers interposed between the disks on one shaft and the disks on the other shaft, and whereby adjustment of the said idlers toward one shaft and away from the other, or vice versa, serves to vary or change the ratio of transmission between two shafts, thus providing a variable or change speed friction transmission from either shaft to the other, depending upon which shaft is used as the input shaft and which one is used as the output shaft.

It is also an object to provide certain details and features of construction and combinations tending to increase the general efficiency and the desirability of a variable friction drive transmission of this particular character.

To these and other useful ends, the invention consists in the matters hereinafter set forth and claimed, and shown in the accompanying drawings, in which,—

Fig. 3 is a vertical longitudinal section, showing certain parts in elevation, on line 3—3 in Fig. 1 of the drawings.

Fig. 4 is a horizontal section on line 4—4 in Fig. 1 of the drawings.

Figure 1:
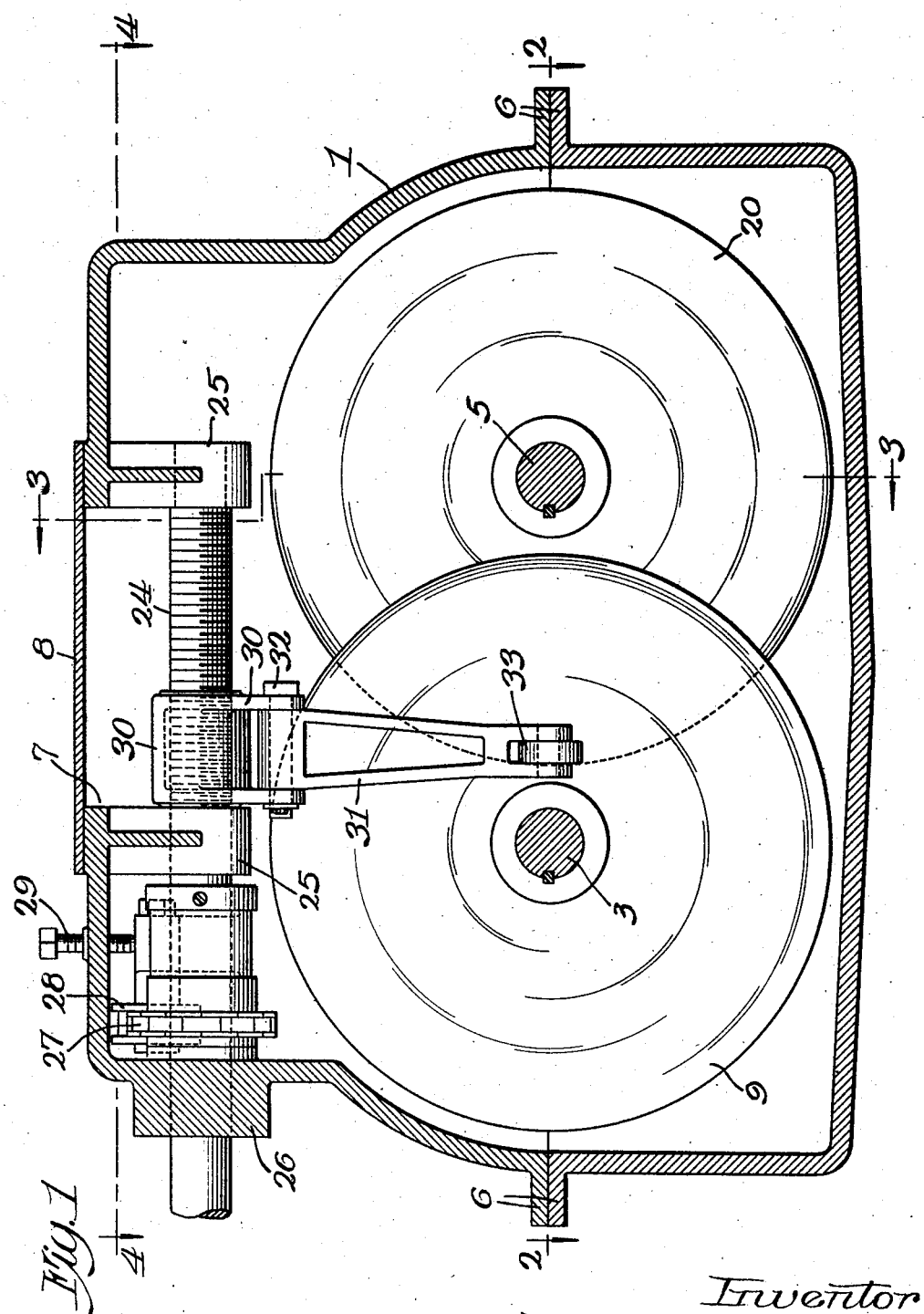
Fig. 1 is a transverse vertical section on line 1—1 in Fig. 3 of the drawings, showing a variable speed friction drive transmission embodying the principles of the invention.
Figure 2:
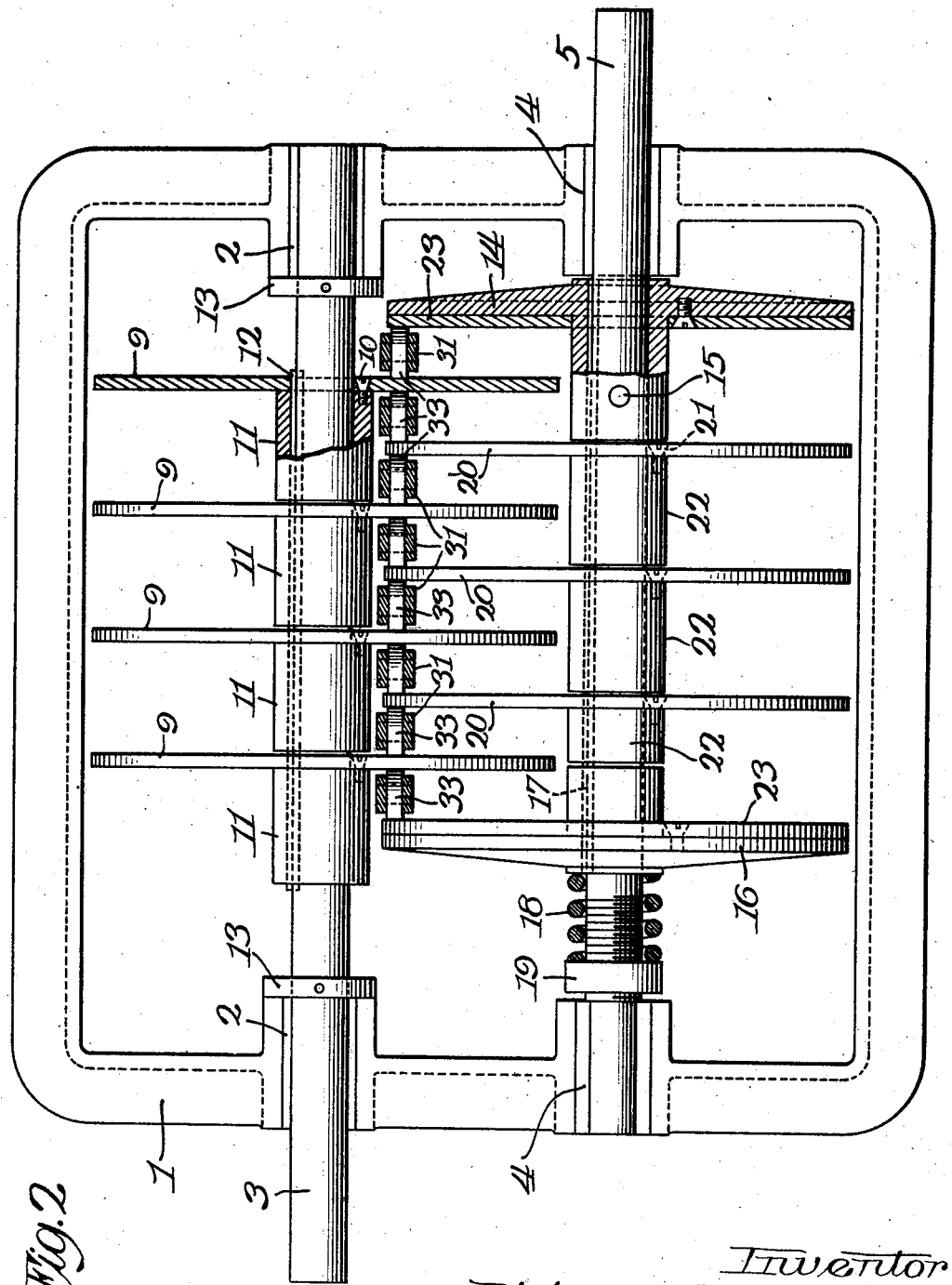
Fig. 2 is a horizontal section on line 2—2 in Fig. 1 of the drawings, showing certain parts in plan view.

As thus illustrated, the invention comprises a casing or housing 1 formed with bearings 2 and 2 for the shaft 3, and also formed with bearings 4 for the shaft 5, whereby these two shafts are disposed in the same horizontal plane, as shown more clearly in Fig. 1 of the drawings. Said casing is made in two parts, comprising upper and lower sections having meeting flanges 6 which can be secured together in any suitable or desired manner, whereby the bearings 2 and 4 are in the nature of split bearings to facilitate the assembling of the different parts. The top of the casing is preferably provided with a hand hole or opening 7 covered by a movable plate 8, which latter can be detachably secured in place by any suitable or desired means.

Disks 9 are secured by screws 10 to their respective sleeves 11, and the latter are splined by a key 12 on the shaft 3, whereby these disks are keyed to rotate with the shaft, but are free to shift axially of said shaft. Removable collars 13 are provided on the shaft 3, for engagement with the inner ends of the bearings 2 and 2, thus providing thrust bearings to prevent axial displacement of the shaft 3 in said bearings.

The end disk 14 is fixed on the shaft 5, as by a screw 15, or any suitable or desired means, while the end disk 16 is simply keyed on this shaft by the spline 17, as shown, with a coil spring 18 interposed between this disk 16 and the adjustable collar 19, which is screw-adjustable on this shaft. The intermediate disks 20 are similar to the disks 9, being secured by screws 21 to their respective sleeves 22, and these sleeves being keyed on the shaft 5 by the spline 17 previously mentioned. In this way, the disks 16 and 20 are keyed to rotate with the shaft 5, but are free to have axial displacement on this shaft, in opposition to the yielding resistance of the spring 18 previously mentioned. The disks 14 and 16 are preferably faced with wearing plates 23 of any suitable or desired material.

Horizontally disposed screws 24 are supported against endwise displacement, but for rotation in unison in the bearings 25, which are integral with and which depend from the upper wall of the casing or housing. These screws have unthreaded portions which extend outwardly through the bearings 26 formed in one upper side wall of the casing or housing. Inside the housing, the two screws 24 are connected together for rotation in unison by a sprocket chain 27 applied to suitable sprocket wheels on said screws, whereby rotation of one screw will necessarily rotate the other screw at the same speed. A belt tightener 28 is provided in suitable manner to engage the upper stretch of said sprocket chain, and a set screw 29 may be provided for adjusting said belt tightener, in a manner that will be readily understood. The outer end portion of either screw-threaded shaft 24 may be provided with or connected to means for rotating it, thereby to rotate the two screws in unison.

A supporting member 30 is supported on the screw-threaded portions of the shafts 24, between the bearings 25, shown more clearly in Figs. 1 and 4, and depending arms 31 are pivoted on said member by the pivots 32, in the manner shown, so that these arms each hang down between a disk on one shaft 3 and a disk on the other shaft 5, and the lower end of each arm is provided with a friction idler 33 engaging the opposing surfaces of the two adjacent disks. In this way, with the arrangement shown and described, there are eight friction disk couples between the two shafts, and there is a friction idler interposed between and engaging the members of each couple.

In use, either one of the two shafts 3 or 5 may be coupled with a source of power, and thus employed as the input shaft for the variable speed friction transmission. The other shaft, whichever one it may be, which is not thus coupled with a source of power, will then become the output shaft of the friction drive mechanism. Assuming, therefore, that power is applied to the shaft 3, with the parts in the positions in which they are illustrated in the drawings, the result will be that the power frictionally transmitted from the disks on the shaft 3 through the idlers 33 to the disks 20 will rotate the shaft 5 at a much slower speed than the rotation of the first mentioned shaft, the shaft 3 rotating several times to each complete rotation of the shaft 5, with the idlers 33 occupying the positions in which they are shown in the drawings. Assuming that it is desired to increase the speed of rotation of the shaft 5, the screws 24 will be rotated in a direction to shift the idlers 33 toward the shaft 5, and it will be seen that this can be done until the idlers are quite near the shaft 5, whereby the shaft 5 will then rotate several times to each rotation of the shaft 3, assuming the latter to be the input shaft. In this way, friction idlers are employed, having their axes at right angles to the axes of the disks, in such manner that the pressure at diametrically opposite points on each idler is balanced, whereby there is no lateral thrust on the bearings of these idlers at the lower ends of the arms 31 by which they are supported. Furthermore, the pressure on opposite sides of the disks 9 is balanced, as well as on opposite sides of the disks 20, and it is only the disks 14 and 16 that sustain a one-sided or unbalanced pressure. However, by making these disks 14 and 16 relatively heavy, they will be able to sustain the pressure of the friction idlers without danger of breakage or distortion. The pressure of the spring 18 must be sufficient to insure driving contact between the disks and the idlers, so that there will be no rotary slippage between them; but, of course, as the surfaces are smooth, and as the screws 24 provide powerful adjusting means, the idlers 33 can be forced by slippage in one direction or the other, either to increase the speed of the output shaft or to decrease the speed thereof.

It will be understood, of course, that the number of disks on each shaft may be changed or varied without departing from the spirit of the invention, as for some purposes a comparatively small number of disks may be sufficient, while for other purposes a larger number will be necessary. Also, the number of screws 24 is not material, and any suitable number of screws can be employed, depending upon the size and particular use to be made of the change-speed transmission. Moreover, while only one friction idler is shown between each disk couple between two shafts, it is obvious that any suitable or desired number of idlers may be employed between each disk, without departing from the spirit of the invention, depending upon the requirements of each particular case.

Because of the individual pivotal connections 32 for the idlers 33, it will be seen that these idlers can move relatively to each other, or toward and away from each other, should the form or condition of the discs so require. Being supported on parallel screws, these idlers are easily adjusted with accuracy.

What I claim as my invention is:

1. In a change-speed friction drive transmission, the combination of two parallel shafts, friction disks on said shafts, the disks of one shaft overlapping the disks of the other shaft, forming a plurality of friction disk couples between the two shafts, and a friction idler interposed between and engaging the opposing surfaces of each disk couple, together with means including parallel screws with an individual pivotal mounting thereon for each idler for adjusting said idlers toward one shaft or the other, thereby to change or vary the ratio of rotation between the two shafts.

2. A structure as specified in claim 1, one or more of said disks being splined to shift axially, and spring means for causing yielding pressure of the disks on said idlers.

3. A structure as specified in claim 1, one or more of said disks being splined to shift axially, and spring means for causing yielding pressure of the disks on said idlers, together with means permitting said idlers to follow and move with any axial shift of one or more of said disks.

4. A structure as specified in claim 1, comprising means whereby a plurality of disks on each shaft are capable of free axial shift thereon, and spring means applied to an end or outer disk to cause the axially movable disks to exert pressure on the interposed idlers, said idlers being free to follow or move with any axial shift of the disks, whereby pressure on a plurality of said disks is balanced on opposite sides of each disk, and whereby pressure at diametrically opposite points on each idler is also balanced.

5. A structure as specified in claim 1, said means for adjusting the idlers comprising arms projecting between the disks, each arm having a bearing for its allotted idler, a support upon which each arm is pivoted to swing about an axis parallel with the axis of its allotted idler, and devices for shifting said support in a plane parallel with the plane of said shafts.

6. A structure as specified in claim 1, said means for adjusting the idlers comprising arms projecting between the disks, each arm having a bearing for its allotted idler, a support upon which each arm is pivoted to swing about an axis parallel with the axis of its allotted idler, and devices for shifting said support in a plane parallel with the plane of said shafts, said devices comprising one or more screw-threaded shafts engaging said supporting member, rotatable to provide screw adjustment of said member back and forth in the plane thereof.

7. A structure as specified in claim 1, comprising pivoted or swinging arms for supporting said idlers, forming a part of said means for adjusting the idlers.

8. A structure as specified in claim 1, said idlers having parallel axes disposed in the plane of said shafts, extending at right angles to each shaft, and said adjusting means serving to shift said idlers back and forth axially in said plane of the shafts.

Specification signed this twenty-fifth day of July, 1929.

RICHARD S. JACOBSEN.